Figure 1:
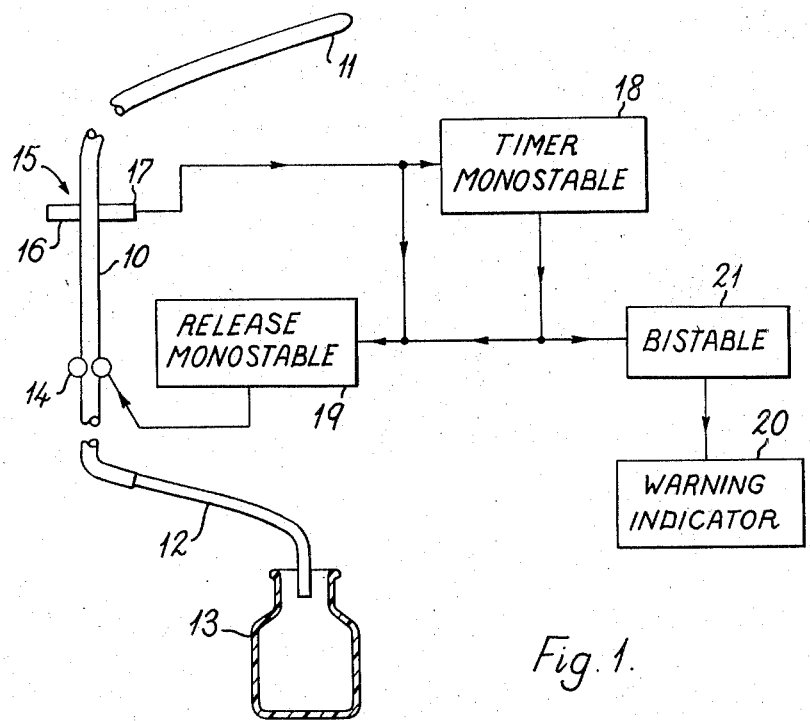

United States Patent [19]

Stewart

[11] 3,818,895

[45] June 25, 1974

[54] OLIGAEMIC SHOCK ASSESSMENT APPARATUS

[76] Inventor: John Stewart Simpson Stewart, 50 The Common, Parbold, Wigan, England

[22] Filed: Oct. 31, 1972

[21] Appl. No.: 302,420

[30] Foreign Application Priority Data

Nov. 1, 1971 Great Britain ................... 50769/71
Dec. 17, 1971 Great Britain ................... 58885/71

[52] U.S. Cl. .............. 128/2 F, 128/2 H, 128/294, 73/223
[51] Int. Cl. ...................... A61f 5/44, A61b 10/00
[58] Field of Search ........... 128/2 F, 2 H, 275, 249, 128/294, 351, 295; 73/223, 113

[56] References Cited
UNITED STATES PATENTS

| | | | |
|---|---|---|---|
| 2,816,997 | 12/1957 | Conrad | 128/2 H X |
| 3,000,207 | 9/1961 | Goffe | 73/113 |
| 3,019,649 | 2/1962 | Kuntz et al. | 73/223 |
| 3,078,714 | 2/1963 | Brown | 73/223 |
| 3,499,435 | 3/1970 | Rockwell et al. | 128/351 |
| 3,561,427 | 2/1971 | Profy | 128/275 |
| 3,583,400 | 6/1971 | Memhardt | 128/275 |
| 3,651,694 | 3/1972 | Lamb | 128/2 H X |

*Primary Examiner*—Aldrich F. Medbery
*Attorney, Agent, or Firm*—Cushman, Darby and Cushman

[57] ABSTRACT

The onset of oligaemic shock is assessed by monitoring urine flow and, additionally, deep body temperature. Urine flow is channelled by a bladder catheter to a tube which is repeatedly occluded for intervals terminated by accumulation of a predetermined quantity of urine or a time period, which quantity and period together represent a normal flow rate. A warning is given if the period terminates before the quantity is accumulated, thus representing abnormally low flow rate. Deep body temperature can be additionally monitored by provision of a thermoelectric transducer at the tip of the bladder catheter and, again, warning given for an abnormal value.

6 Claims, 5 Drawing Figures

OLIGAEMIC SHOCK ASSESSMENT APPARATUS

The assessment of shock in association with oligaemia is a common requirement although there appears to be no commercially — available apparatus which has been specifically developed for this purpose.

An object of the present invention is to make good this deficiency and to this end provides oligaemic shock assessment apparatus comprising: clamp means for occluding a tube communicating a bladder catheter with a urine reservoir or drain; sensor means for detecting when the quantity of urine accumulated in said tube, when occluded by said clamp, reaches a first predetermined value, said sensor means providing first signals representing such detection events; timer means for generating second signals representing predetermined time intervals; release means responsive to said first or second signals to open said clamp means to drain said tube; and indicator means responsive to said first and second signals to indicate when the rate of accumulation of urine in said tube falls below a second predetermined value.

It will be appreciated from the foregoing statement that urine flow rate is a useful parameter in the assessment of shock and that decrease of the value of this parameter below a predetermined level can serve as a warning of the onset of shock requiring medical attention.

In any event, the assessment apparatus outlined above can operate in two ways. In both modes of operation the timer generates signals at regular intervals while the sensor is arranged to detect when the minimum quantity of urine has accumulated for normal rates of flow during such an interval. Then generation of a first signal before, or together with, a second signal indicates that the flow rate is normal, but the contrary situation indicates that the flow rate is abnormally low.

In a first mode of operation the release means is operated by the first or second signals, whichever is first, and a warning is provided at each release event dependent on the above consideration regarding the relative timing of the first and second signals.

In a second mode of operation the release means is operated by the first signals from the sensor and a warning is given if a timer second signal occurs before this event. While the warning facility is available under both modes of operation, the second mode allows a record to be made in respect of urine flow since the tube is drained only when a predetermined quantity of urine has accumulated and data concerning the relative timing of these events can be obtained by reference to the timer.

While the invention has been discussed so far with reference to the parameter of urine flow rate, another parameter relevant to the assessment of shock is the deep body or so-called core temperature. This core temperature is indicated by way of urine temperature but is more usually measured for clinical purposes by use of a rectal probe, or in other ways, since there is no commercially — available equipment to afford reliable measurement of the former kind.

Another object of the present invention is to make good this last deficiency and to this end provides a bladder catheter having a thermoelectric transducer mounted therein adjacent the tip of the catheter.

It is not suggested that the proposed catheter is appropriate for measurement of core temperature in all circumstances. However it is clearly appropriate to the present circumstances of shock assessment involving use of a bladder catheter in connection with urine flow measurement.

Figure 2:
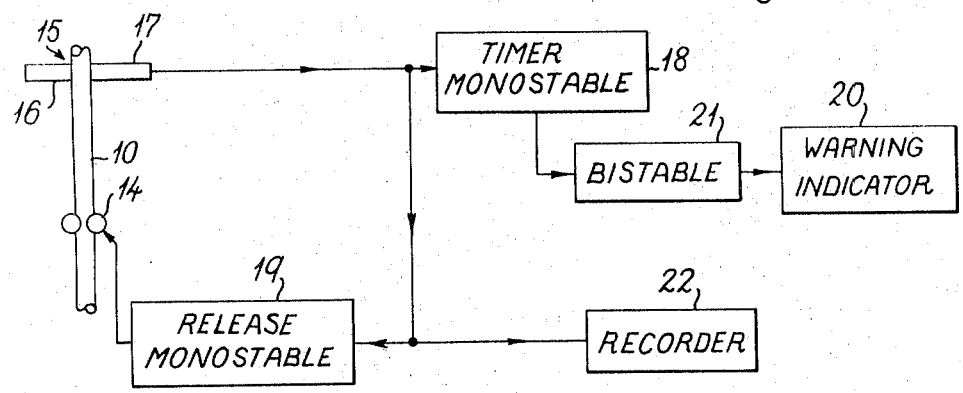
Figure 3:
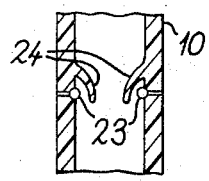
Figure 4:
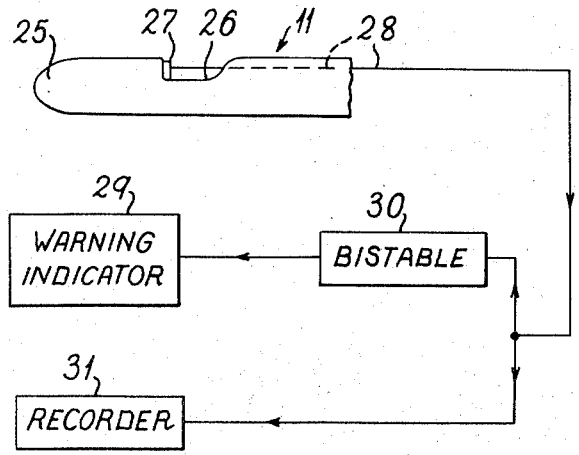
Figure 5:
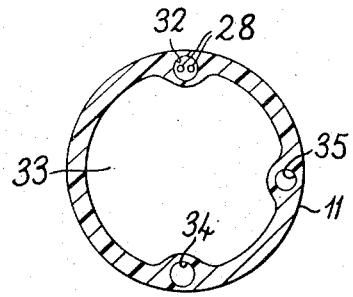

In order that the invention may be better understood the above and other possible variations therein will now be described by way of example with reference to the accompanying drawings, in which:

FIG. 1 schematically illustrates one embodiment of the invention;

FIG. 2 similarly illustrates another embodiment of the invention;

FIG. 3 illustrates a modification suitable for application to the embodiments of FIGS. 1 and 2;

FIG. 4 schematically illustrates a special form of catheter suitable for use in the embodiments of FIGS. 1 and 2; and FIG. 5 illustrates a possible cross-sectional form for the catheter of FIG. 4.

The apparatus of FIG. 1 comprises a tube 10 communicating a bladder catheter 11 with a further tube 12 leading to a drain or reservoir in the form of a urine collecting vessel 13. The tube 10 is embraced at a position towards the tube 12 by a clamp 14 which normally operates to occlude the tube 10 but which is releasable by electromagnetic action to open the tube 10.

The tube 10 is also embraced by a urine level sensor 15 comprising a source 16 which projects a beam of light through the tube on to a photoelectric cell 17. This sensor can act to produce a signal from the cell 17 in response to the light beam, which signal is significantly reduced when the beam is refracted, scattered or disipated by filling of the tube with urine to obstruct the beam. Such a form of sensor is commonly used to monitor the fall of drops in drip-feed apparatus, and the only difference here is that the sensor should not be so sensitive as to produce a significantly reduced signal due to obscuration of the beam by normal flow, rather than accumulation, of urine in the tube 10. In any event it will be appreciated that the sensor 15 can produce first signals indicating when the tube 10 is full between the sensor and the clamp 14 and this can indicate accumulation of a predetermined volume of urine. The volume in question can, of course, be adjusted to suit different flow rates by varying the relative spacing of the sensor and clamp along the tube and/or by selecting appropriate shapes and sizes of tube. This point is of practical significance in that while adjustment of the sensor-clamp spacing may be sufficient to take account of normal variations in urine flow rate, the catheter may be of irrigating form and add a constant, relatively large flow of additional liquid to the urine flow. In the latter case a larger capacity tube will be appropriate.

In any event, the output signals from the sensor 5 are applied to two monostable devices 18 and 19 to set the same to their unstable states. The first device 18 will normally have a longer period than the second device 19, and serves as a timer to produce an output signal in its stable state at a predetermined interval after actuation by the sensor. This output signal from the device 18 also serves to set the device 19 to its unstable state.

The device 19 serves as part of the release means for the clamp 14 and effects, in its unstable state, electromagnetic release of the clamp in response to actuation by the sensor or timer. The unstable period of the device 19 will be chosen to ensure that the clamp is released for a sufficient period to allow complete draining of the accumulated urine in the tube 10.

The remaining component of FIG. 1 is the warning indicator 20 which can comprise a lamp, buzzer or other appropriate means actuated by the stable state output of the timer monostable device 18. It is to be noted that the indicator is accordingly only actuated when the volume of urine corresponding to actuation of the sensor has not accumulated within the period determined by the timer. Moreover, the indicator will remain actuated while such a situation repeatedly occurs, but will be returned to a passive state if the low urine flow rate increases again to a normal level. This last factor may be considered undesirable and the warning actuating output from the device 18 can be applied to the indicator 20 by way of a bistable device 21 to ensure that the warning indication remains active, once actuated, until reset by appropriate personel.

Turning to the embodiment of FIG. 2: this is largely the same as that of FIG. 1 and corresponding reference numerals are accordingly used where appropriate. However, it is to be noted that the clamp 14 is only released in response to the sensor 15 so that the tube 10 is only drained when 'full.' This does not detract from the warning facility since it is still possible for the timer monostable device 18 to actuate the warning indicator 20 before the tube is full as in the embodiment of FIG. 1.

The additional facility in FIG. 2 is that of a recording device 22 responsive to the sensor to record data concerning urine flow. The device 20 can be a pen recorder or equivalent means which moves a record medium at a constant speed relative to a recorder which marks the record when the sensor actuates. The resultant record will indicate any variations in accumulation times for successive equal volumes of urine and so shows the urine flow rate.

As an additional facility, or an alternative, the recording device 22 can include an integrator to provide an indication of total urine flow. Clearly, such an integrator can be associated with an additional facility and a divider to provide an indication of average flow rate and this may be used without a pen recorder.

There are, of course, variations which can be made elsewhere in apparatus according to the invention. For example, the sensor arrangement can be gravimetric to detect a predetermined weight of urine rather than volume, there being a close correlation between these for the purposes of flow rate measurement. Alternatively, the sensor can be purely electrical by use of opposed electrodes 23 in the wall of the tube 10, which electrodes are connected in a conducting path by filling of the tube. Such an arrangement is illustrated by FIG. 3 which additionally shows the provision of hood-like extensions 24 within the tube to protect the electrodes against connection through normal flow of urine in the tube.

Variation can also be made in the release means for the clamp 14 such as by use of a relay having a predetermined slow release in place of the monostable device. Clearly other functionally analagous variations can be made in practical realisation of the invention compared to the embodiments of FIGS. 1 and 2.

Considering now the catheter 11, this can advantageously include a thermoelectric transducer to provide a measure of core temperature. One such catheter is illustrated by FIG. 4 in which the catheter 11 has a solid tip portion 25 formed with a cavity 26 in its side. A thermistor 27 is mounted on the proximal wall portion of this cavity and has leads 28 passing back through the catheter for connection to a second warning indicator 29 which serves to call attention of personel when the temperature sensed by the thermistor is abnormal. The sensed temperature will be that of urine passing around the catheter tip and into the cavity (with which a urine flow lumen of the catheter can communicate) and this temperature is effectively the desired core temperature. The warning actuation signal can be applied, as in FIGS. 1 and 2, by way of a bistable device 30 and the leads 28 can also be connected to a recording device 31.

FIG. 5 shows a section through the catheter of FIG. 4 taken distally relative to the cavity 26, which section shows passage of the leads 28 through a separate lumen 32 from the main lumen 33. Indeed the catheter can be of self-retaining, irrigating form having a further irrigation lumen 34 and a fourth lumen 35 for connection to a Foley balloon. It will, of course, not normally be appropriate to effect core temperature assessment with continuous irrigation since the irrigation liquid flow rate will usually be such as to swamp any urine temperature variations. However, irrigation is often intermittent and core temperature measurement is then possible in the proposed manner.

I claim:

1. Oligaemic shock assessment apparatus comprising:

a clamp to occlude a tube communicating a bladder catheter with a urine receiving means;

a sensor comprising a means for detecting a predetermined quantity of urine accumulated in said tube, said sensor providing a first signal representing such detection when the tube is occluded by said clamp when reaching a predetermined value;

a timer means for generating second signals representing termination of respective predetermined uniform time intervals, said timer being connected with said sensor to be reset in response to each of said first signals;

release means for opening said clamp to drain accumulated urine from said tube, said release means being connected to at least said sensor for actuation in response to said first signals; and an indicator means operably connected with said sensor and timer for response to said first and second signals for indicating when said predetermined value of urine fails to accumulate in said tube during one of said predetermined intervals.

2. Apparatus according to claim 1 further comprising logic means connected with said sensor and timer to provide a third signal in response to the first occurrence of said first and second signals during each of said intervals, and wherein said release means is connected with said logic means for actuation in response to said third signal.

3. Apparatus according to claim 1 wherein said release means is connected only with said sensor for actuation in response to said first signals, and said apparatus further comprises a recorder connected with said sensor to record a respective representation of said predetermined value of accumulated urine in response of each of said first signals.

4. Apparatus according to claim 1 further comprising a bladder catheter for communication with said tube, which catheter has a thermoelectric transducer mounted thereon adjacent the catheter tip to detect urine temperature, and further indicator means responsive to said transducer to indicate urine temperature as a representation of deep body temperature.

5. Apparatus according to claim 4 wherein said catheter comprises a solid tip portion having a cavity formed in the side thereof, and said transducer is mounted on the proximal wall portion of said cavity.

6. Apparatus according to claim 4 wherein said catheter has a first lumen for flow or urine therethrough, and at least one further lumen through which are passed electrical connections between said transducer and further indicator means.

* * * * *